United States Patent
Drocco et al.

(10) Patent No.: US 10,843,149 B2
(45) Date of Patent: Nov. 24, 2020

(54) MOVING SYSTEM FOR CONTAINERS BETWEEN STATIONS FOR A FLUID PRODUCTION PLANT

(71) Applicants: Luca Drocco, Alba (IT); Mario Drocco, Alba (IT)

(72) Inventors: Luca Drocco, Alba (IT); Mario Drocco, Alba (IT)

(*) Notice: Subject to any disclaimer, the term of this patent is extended or adjusted under 35 U.S.C. 154(b) by 509 days.

(21) Appl. No.: 15/310,632

(22) PCT Filed: May 5, 2015

(86) PCT No.: PCT/IB2015/053261
§ 371 (c)(1),
(2) Date: Nov. 11, 2016

(87) PCT Pub. No.: WO2015/173689
PCT Pub. Date: Nov. 19, 2015

(65) Prior Publication Data
US 2017/0072374 A1    Mar. 16, 2017

(30) Foreign Application Priority Data

May 13, 2014 (IT) .............................. TO2014A0379

(51) Int. Cl.
*B01F 13/10* (2006.01)
*B25J 15/00* (2006.01)
*B65G 37/02* (2006.01)

(52) U.S. Cl.
CPC ....... *B01F 13/1072* (2013.01); *B25J 15/0014* (2013.01); *B01F 2215/005* (2013.01); *B65G 37/02* (2013.01)

(58) Field of Classification Search
CPC .............. B01F 13/0032; B01F 13/1072; B25J 15/0014; B65G 37/00; B65G 37/02; B65G 1/10; B65G 1/0485; B66F 9/06
See application file for complete search history.

(56) References Cited

U.S. PATENT DOCUMENTS

| 3,727,778 A | * | 4/1973 | Hollenbach | ............... | B66F 9/06 |
| | | | | | 280/638 |
| 5,634,716 A | * | 6/1997 | Westall | ................. | B28C 7/0495 |
| | | | | | 366/141 |

(Continued)

FOREIGN PATENT DOCUMENTS

| JP | 61-287970 A | 12/1986 |
| JP | 2-16170 A | 1/1990 |

(Continued)

OTHER PUBLICATIONS

International Search Report and Written Opinion for International Application No. PCT/IB2015/053261, dated Sep. 8, 2015, 10 pages.

(Continued)

*Primary Examiner* — Gerald McClain
(74) *Attorney, Agent, or Firm* — Merchant & Gould P.C.

(57) ABSTRACT

A moving system moves containers between stations of a production plant to produce fluids, such as paints. The system includes at least one input/output station, in which the container is introduced into/removed from the moving system. At least one gripping device grips the container arranged in a station. At least one first moving device moves the container between at least two stations. The first gripping device includes forks for engaging with the container. The first moving device includes at least one first actuator, for moving the forks at least along a longitudinal axis of the forks. The input/output station includes a second gripping device, for gripping the container arranged in the station, and a second moving device, for moving the second gripping device at least along a vertical axis.

5 Claims, 9 Drawing Sheets

(56) References Cited

U.S. PATENT DOCUMENTS

| | | | | |
|---|---|---|---|---|
| 5,946,217 | A * | 8/1999 | Lhoest | B65D 88/32 |
| | | | | 700/228 |
| 9,555,613 | B2 * | 1/2017 | Shigeta | B41C 1/18 |
| 2004/0255817 | A1 * | 12/2004 | Yang | B66F 9/141 |
| | | | | 105/238.1 |
| 2007/0091717 | A1 | 4/2007 | Steinwald | |
| 2012/0177465 | A1 * | 7/2012 | Koholka | B65G 1/0485 |
| | | | | 414/279 |
| 2015/0128397 | A1 * | 5/2015 | Kozasa | B23P 21/004 |
| | | | | 29/33 K |

FOREIGN PATENT DOCUMENTS

| | | |
|---|---|---|
| JP | 2012-1343 A | 1/2012 |
| JP | 2012-1344 A | 1/2012 |
| JP | 2012001344 A * | 1/2012 |

OTHER PUBLICATIONS

International Preliminary Report on Patentability and Written Opinion for International Application No. PCT/IB2015/053261, dated Nov. 15, 2016, 6 pages.

* cited by examiner

MOVING SYSTEM FOR CONTAINERS BETWEEN STATIONS FOR A FLUID PRODUCTION PLANT

This application is a National Stage Application of International Application No. PCT/IB2015/053261, filed 5 May 2015, which claims benefit of Serial No. TO2014A000379, filed 13 May 2014 in Italy and which applications are incorporated herein by reference. To the extent appropriate, a claim of priority is made to each of the above disclosed applications.

The present invention relates to a moving system to move containers between at least two stations, for example processing stations, of a plant for the production of fluids, for example a plant for dosing fluid substances, such as paints.

The moving system according to the present invention allows operators to move containers, with different shapes or masses, between at least two stations of a plant, for example stations for processing the content of the container and/or the container itself. In particular, the moving system is especially suited to move containers comprising support legs, which bear the entire weight of the container and of its content.

Belt or chain moving systems are known, which are especially designed based on the type of containers to be moved. In particular, if they are designed for large-mass and large-size containers, they are very expensive to be produced, since every single section of the belt must be able to bear the entire mass of the container. Therefore, belts always seem to be oversized, thus also being too expensive.

Furthermore, these moving systems are only suited to move containers with a large support surface, for example containers with a flat bottom, wherein the weight of the container is spread over a large area of the moving system.

These moving systems, if they are used to move containers comprising three or more support legs, should be designed to bear great weights in particular points of the moving system itself or could be subject to jamming or binding of the container itself.

In order to avoid these problems, prior art systems associate said container with a support surface that can be moved on roller systems or on conveyor belts.

Furthermore, moving systems are known, which use carriages—that are controlled by a remote moving system—or chain systems. Moreover, carousel systems are known, in which the containers—associated with a moving system—carry out a given sequence of operations between the processing stations. In these embodiments the container is constrained to the moving system in a rigid manner.

Both solutions described above are affected by the technical problem of being scarcely versatile, since the stations must be arranged in a particular sequence and the containers, fed in sequence, are not allowed to follow different paths.

Furthermore, since they use planes on which to support said containers with support legs, prior art moving systems have different technical problems concerning the insertion and the removal of the containers with associated support plane into and from the moving system.

When moving containers with sizes below 100 liters, for example barrels, handlers are used, which are designed to grab said containers lying on the ground and to lift them in order to place them on belt or roller moving systems.

This technology cannot be used when the container to be moved has sizes exceeding 100 l—and this is due both to the costs to be borne to produce said handlers and to the space taken up by the system, as the resulting handler would be considerably large.

Fork moving systems are known, which are applied to vehicles or moving portals and are able to place or extract objects of a different nature into or from vertical stores.

The main technical problem to be solved is that of providing a moving system that is able to move containers with different sizes and, at the same time, allows operators to treat containers provided with support feet as well as containers with a flat bottom.

According to the present invention, in order to solve the aforesaid technical problems, there is provided a fork moving system with a station to introduce/remove the container into/from the system itself.

One aspect of the present invention relates to a moving system.

A further aspect of the present invention relates to a plant.

The features and advantages of the moving system according to the present invention and of the plant will be best understood upon perusal of the following detailed description of an embodiment with reference to the accompanying drawings, which respectively show what follows:

FIGS. 3A, 3B, 3C and 3D show a first embodiment of a cell of the moving system; in particular.

FIGS. 4A-4F show a second embodiment of a moving cell; in particular.

FIGS. 5A-5E show a third embodiment; in particular.

FIGS. 6A-6E show different views of an input/output station of the system according to the present invention; in particular.

With reference to the figures mentioned above, the moving system to move containers "C" between stations "S" of a production plant 1 for the production of fluids, such as paint, is indicated with number 2.

Figure 1:
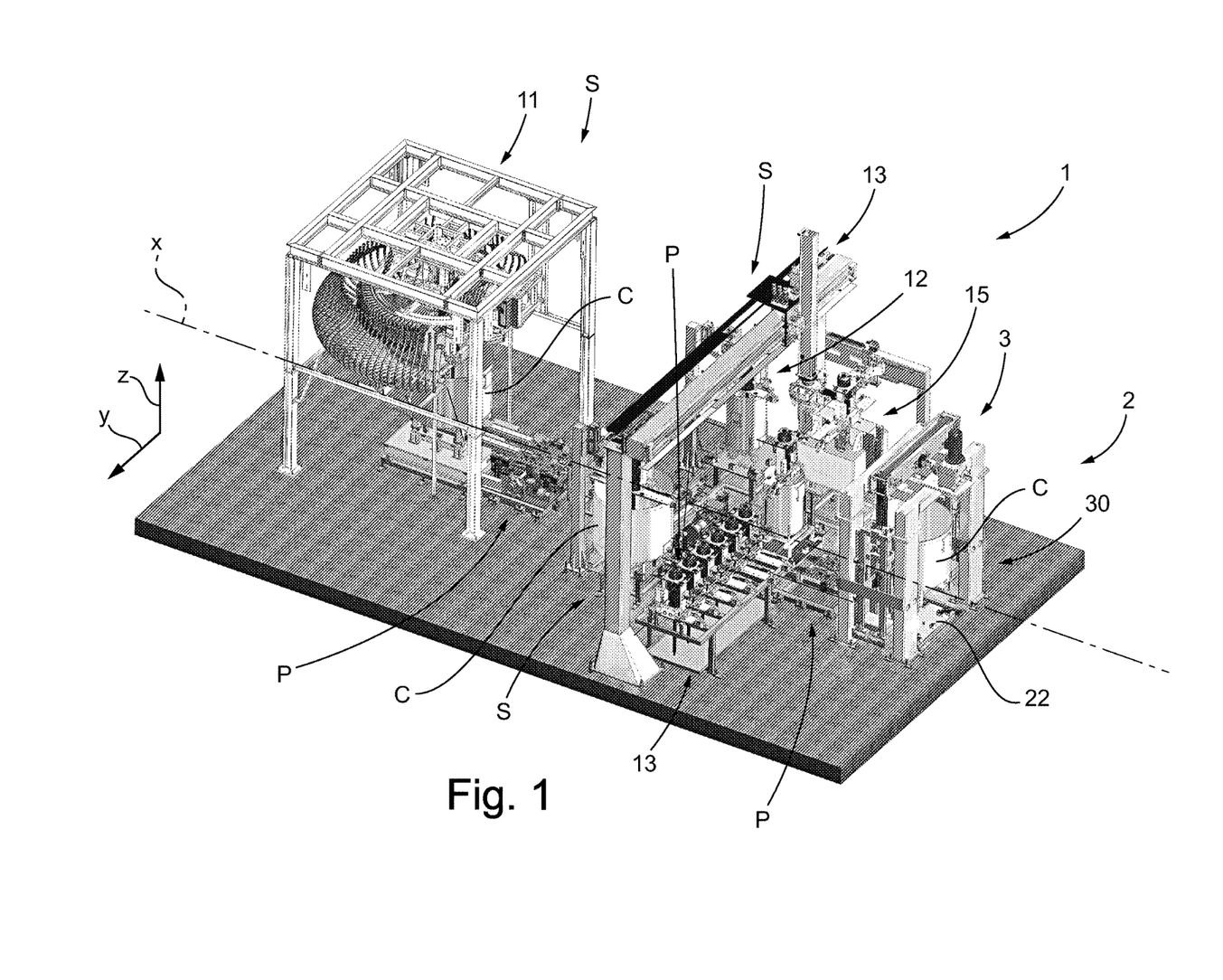
FIG. 1 shows, in a perspective view, an explanatory embodiment of the moving system according to the present invention applied to a plant for the production of fluids, such as paints.

Containers "C", which are preferably introduced into production plant 1 and then moved by means of moving system according to the present invention, comprise support protuberances "C1", at least three, preferably four protuberances, which will bear the weight of container "C". Said support protuberances "C1" are legs, as show in FIGS. 3A-3C, 4E-4F and 6A-6B. Furthermore, containers "C" can have different shapes and sizes based on the type of fluid to be contained and on the volume of fluid to be contained on the inside, which, for example, can range from 100 liters up to 1000 liters. FIG. 1 shows different containers, with different sizes, moved by moving system 2 according to the present invention between different stations "S". These containers are all cylindrical, but even containers with a quadrilateral cross-section could be used.

Moving system 2 according to the present invention substantially develops on a plane, which coincides with or is parallel to the ground, along at least one line, if necessary along a broken line, for example a closed line.

Said system 2 comprises at least one input/output station 3, in which container "C" is introduced into/removed from moving system 2. In said station 3, at least one container "C", preferably one container at a time, is positioned, for example by an operator, with the aim of introducing/removing container "C" itself into/from moving system 2 and, thus, production plant 1 for the production of fluids, such as paints, in which system 2 according to the present invention is implemented.

Said moving system 2 comprises at least one first gripping device 4, for gripping container "C" arranged in a station.

For the purpose of the present description, the expression "to grip a container "C"" means to engage container "C" in a removable manner, so as to allow it to move between at least two stations.

Said system 2 comprises at least one first moving device 6 to move container "C" between at least two stations, for example between two stations "S" of the plant or between said at least one input/output station 3 and a generic station "S" of the plant and vice versa.

In moving system 2 according to the present invention, said first gripping device 4 comprises forks 42, which are designed to engage said container "C".

Said forks 42, in particular, are suited to engage and/or move containers "C" comprising support protuberances "C1", such as support legs.

Furthermore, said first moving device 6 comprises at least one first actuator 62, for moving said first gripping device 4 and, in particular, said forks 42, along a longitudinal axis, in particular along the longitudinal axis of the forks themselves, in particular along a horizontal axis. In the first and in the second embodiment of forks 42 shown in the figures and described below, said longitudinal axis substantially coincides with the longitudinal axis of system 2 itself, in particular with a first axis "X".

Preferably, in the embodiment shown herein, said first moving device 6 comprises at least one first actuator 62 for each first gripping device 4, in particular for said forks 42.

Said forks 42 comprise at least two points 420, as one can clearly see in the accompanying figures.

In the preferred embodiment, said moving device 6 comprises a base 61, which is fixed to the ground.

Said first moving device 6 allows operators to move said first gripping device 4—and, in particular, said forks 42—both so as to allow the first gripping device 4 to engage container "C" and so as to enable a movement of container "C", with which gripping device 4 is associated, between at least two stations. In particular, said at least one first actuator 62 is designed to move forks 42 both so as to allow the forks to engage/disengage said container "C" and so as to move container "C" between two stations.

In general, during the movement of container between at least two stations, said at least one first actuator 62 moves the forks along the longitudinal axis of forks 42 themselves, which, for example, coincides with said first horizontal axis "X".

In moving system 2 according to the present invention, said input/output station 3 comprises a second gripping device 32, for gripping container "C" arranged in said station 3, and a second moving device 34, for moving said second gripping device 32 at least along a vertical axis "Z".

Preferably, said second moving device 34 allows operators to move said second gripping device 32 both so as to allow gripping device 32 to engage container "C" and so as to enable a movement of container "C", with which the second gripping device 32 is associated, along said axis "Z".

In the embodiments shown in the accompanying drawings, the moving system comprises a single station 3, which acts both as an input portal of the moving system and as an output portal.

Embodiments that are not shown herein comprise at least two stations 3, one being an input station that, for example, only acts as a input portal and the other one being an output station that, for example, only acts as an output portal. The number and the function of stations 3 comprised in system 2 according to the present invention can change based on plant 1 in which system 2 must be implemented.

In the preferred embodiment, as shown in the accompanying figures, said first gripping device 4 and said first moving device 6 are arranged in a cell "P".

Each cell "P" is suited to move a container "C", preferably one at a time. Said cell "P" can be arranged between at least two stations, for example between two generic stations "S". Alternatively, said cell "P" can be arranged between a station and another cell "P". The arrangement of cells "P" and their number are chosen in accordance with the operating details of plant 1 in which system 2 is implemented.

Each cell "P" comprises said first gripping device and said moving device 6 and, in the lower portion of cell "P", in particular in the part that is not affected by the movement of forks 42, it preferably has a protection casing.

Figure 2:
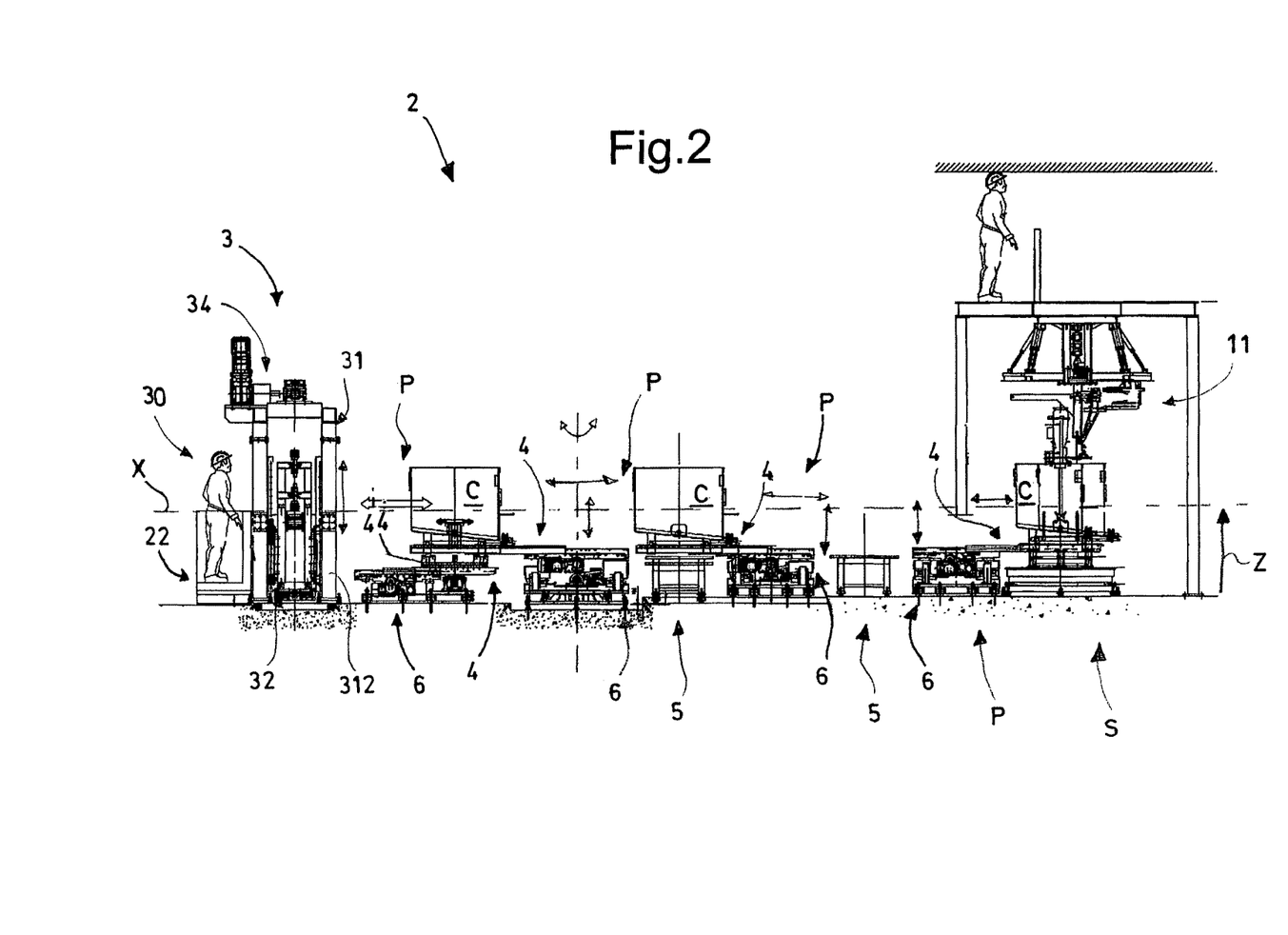
FIG. 2 shows, in a lateral view along the longitudinal extension, a moving system that can be applied to a plant with stations, in different procedural instants shown with an equal number of containers.
Figure 3A:
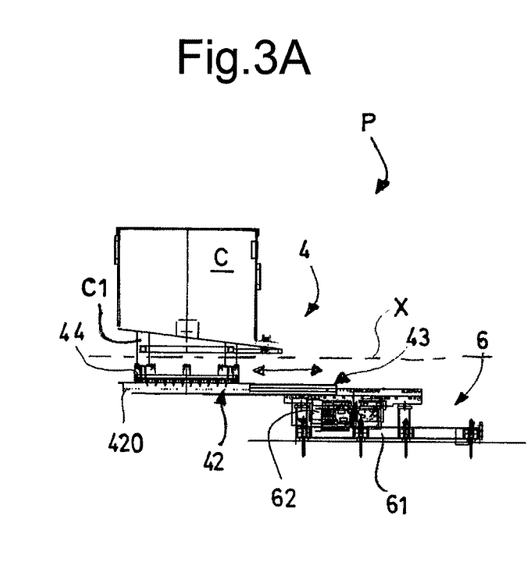
FIG. 3A shows, seen along plane 3-3, a cell in a first configuration, which is extended towards a first end.
Figure 3B:
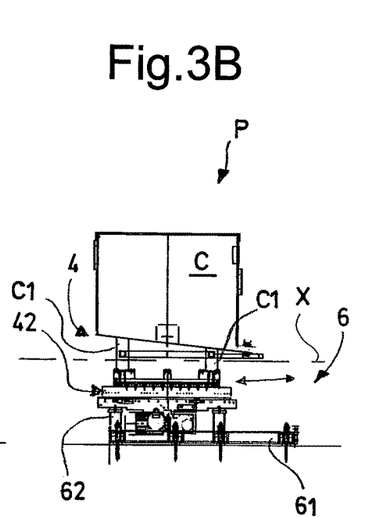
FIG. 3B shows the cell in a second operating configuration, which is contracted.
Figure 3C:
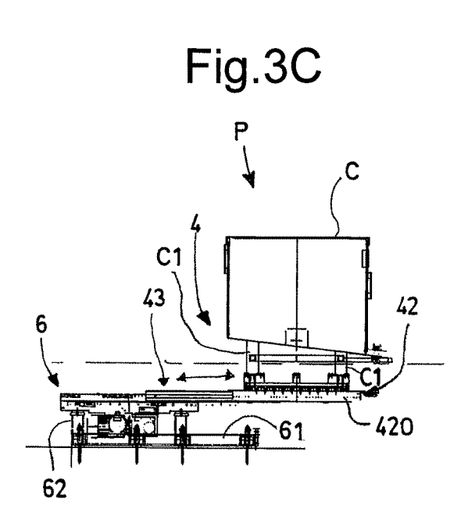
FIG. 3C shows the cell in a third operating configuration, which is extended towards a second end.
Figure 3D:
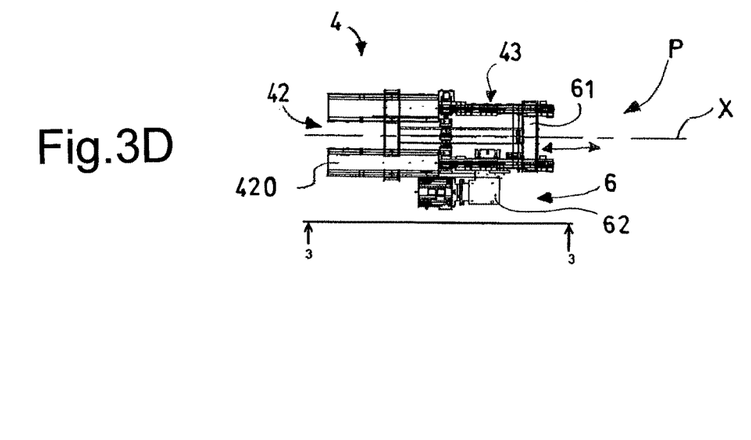
FIG. 3D shows a plan view from above of the cell in an intermediate configuration, which is partially extended towards the first end.

By way on non-limiting example, in order to move a container among three stations arranged along a processing line, in which the movement from one station to the other is carried out in a consecutive, one-way manner, there is a need for at least two cells "P". In particular, each one of said cells "P" is interposed between at least two stations. Therefore, between the three stations "S" there are arranged two cells "P", so as to pick up a container "C" from a station and then move it to the following station "S". FIG. 2 shows, by mere way of example, a possible arrangement of cells "P" based on stations "S" that are available in a plant.

As shown, by way of example, in FIGS. 4A-5D, said first moving device 6 can comprise at least one second actuator 64, for moving said first gripping device 4—and, in particular, said forks 42—along said vertical axis "Z".

The first embodiment of moving system 2 and, in particular, of cells "P" is shown in FIGS. 3A-3D.

In this embodiment, moving device 6 only comprises said at least one first actuator 62 for forks 42, which is suited to move the forks along the longitudinal axis of forks 42 themselves, which, in the accompanying figures, coincides with axis "X". In particular, there is provided one single first actuator, which is able to move the two points 42 of the forks together.

In an explanatory, though non-limiting embodiment, said forks are associated with a ball plane 44, on which container "C" is placed. Said ball plane 44 is especially suited to make up for the simplicity with which said first embodiment of cell "P" is manufactured, so as to receive/release container "C" in an easy manner. By mere way of non-limiting example, said ball plane 44 is schematically shown in FIGS. 2, 3A-3C.

Preferably, said forks 42 are telescopic, at least single-depth forks, preferably double-deep forks.

Said forks are designed to slide, extending, for example in a telescopic manner, along guides 43.

In general, said at least one first actuator 62 is able to move said points 420, which slide on said guides 43, thus extending in a telescopic manner.

In the preferred embodiment, said moving device 6, by means of said at least one first actuator 62, is able to move said forks 42 along both ways of the direction defined by the longitudinal extension of forks 42 themselves. In the example of the accompanying figures, at least the first embodiment of cell "P", besides the other embodiments, is able to move the forks along both ways of the direction defined by the longitudinal extension of the forks, which, in the first embodiment, coincides with axis "X". In particular, said points 420 can extend along both ways of their longitudinal extension.

As one can clearly see in the figures referring to the single embodiments of cell "P", said moving device 6, by means of said first actuator 62, is able to cause said forks 42—and, in particular, said points 420—to move out of the perimeter defined by base 61 of cells "P". FIGS. 3A, 3C, 4A and 4C show cells "P", in different embodiments, in the first configuration and in the third configuration, in which the forks are extended along two opposite directions.

Said first actuator 62 preferably comprises a motor means, shown in the figures, and a mechanism, which is not shown in detail therein and is able to move said telescopic forks 42 along said guides 43. In particular, said motor means and said mechanism are able to move points 420 together along said guides 43. Said first actuator 62 can be manufactured with equivalent embodiments, for allowing said forks to be moved, for example by means of a pneumatic or oil-hydraulic system.

In the second embodiment of cells "P", shown by way of example in FIGS. 4A-4E, said moving device 6, besides being able to fulfill the tasks that are fulfilled by the first embodiment, also comprises a second actuator 64, capable of moving the forks along vertical axis "Z".

Said vertical axis "Z" is perpendicular to the first axis "X" and, moreover, it is normal to the plane in which moving system 2 according to the present invention substantially lies.

Figure 4A:
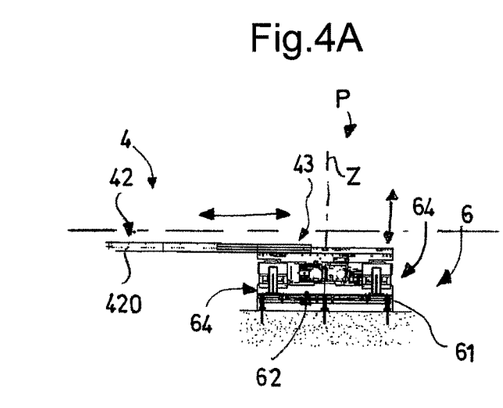
FIG. 4A shows the cell, seen from plane 4A-4A, in a first configuration, which is extended towards a first end.
Figure 4B:
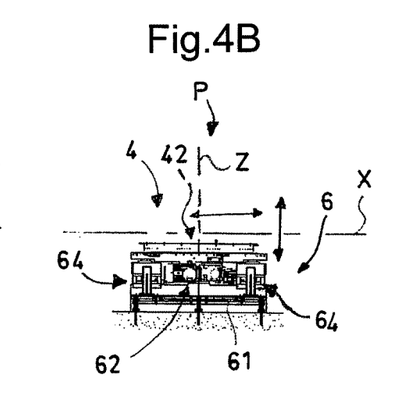
FIG. 4B shows the cell in a second operating configuration, which is contracted.
Figure 4C:
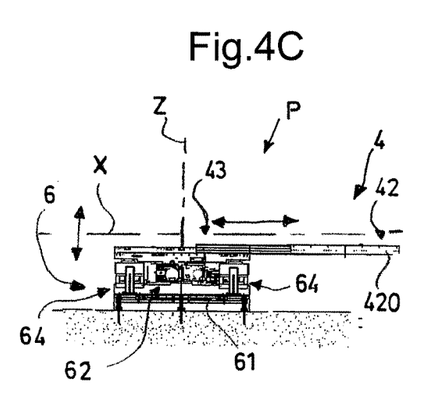
FIG. 4C shows the cell in a third operating configuration, which is extended towards a second end.
Figure 4D:
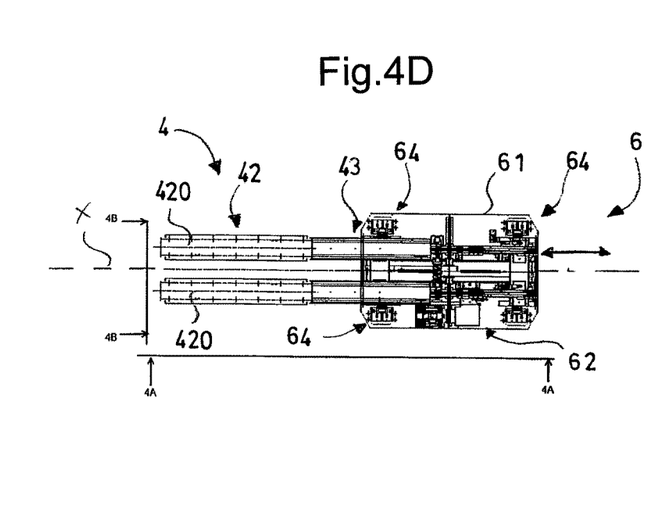
FIG. 4D shows a plan view from above of the cell in an intermediate configuration, which is partially extended towards the first end.
Figure 4E:
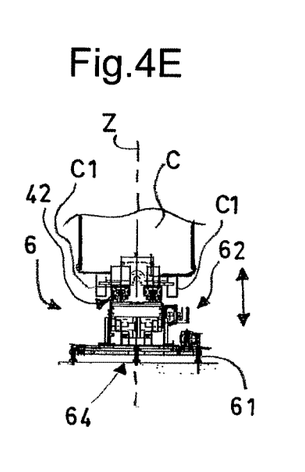
FIG. 4E shows the cell, seen from plane 4B-4B in a fourth configuration, which is lifted.
Figure 4F:
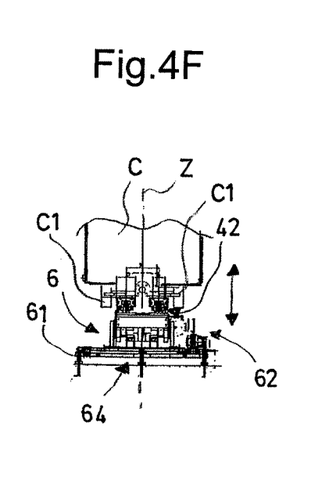
FIG. 4F shows the cell in a fifth operating configuration, which is lowered.

Said second actuator 64 is able to move said forks 42 along said axis "Z", both when they are in an extended configuration, for example shown in FIGS. 4A and 4C, and when they are in a contracted configuration, for example shown in FIG. 4B.

Said second actuator 64 is preferably made with a hydraulic system, for example with a pair of a jacks. Said second actuator 64 can be manufactured with equivalent embodiments, capable of allowing said forks to be moved, for example by means of an electric system.

Each cell, in order to better balance the loads, comprises at least two second actuators 64, which are arranged at the ends of base 61 relative to the longitudinal axis of the forks. This arrangement is evident in the embodiment shown in FIG. 4D. A possible third second actuator can be interposed between said first two second actuators 64.

Said second actuator 64, besides said forks 42, also moves said first actuator 62 along said vertical axis "Z". In this embodiment, said second actuator 64 moves a structure comprising the forks, the guides, said first actuator and all the mechanisms relating thereto. Said second actuator, at one end, is fixed to base 61 of the cell and, at the opposite end, is fixed to said structure to be moved.

In the present embodiment, said first moving device 6 is a single assembly comprising said first actuator 62 and said second actuator 64.

In the third embodiment, shown for example in FIGS. 5A-5D, said moving device 6 comprises, besides one or more technical and function features described above for the first and the second embodiment of said cell "P", at least one third actuator 66, which is designed to cause at least one first gripping device 4 to rotate around a vertical rotation axis, preferably coinciding with said vertical axis "Z".

As already mentioned before, the features of the embodiments described above that can be implemented in the present embodiment of the cell will not be repeated again herein, but they must anyway be considered as possibly comprised in the present embodiment in all possible combinations.

In the third embodiment, preferably said cell "P"—or at least part thereof or, more preferably, all of it—is able to rotate around said rotation axis thanks to said third actuator 66.

The rotation performed by cell "P" can range from 45° to 225°, preferably equals 90° clockwise and 90° counterclockwise relative to a preferred direction, for example along said first axis "X".

Figure 5A:
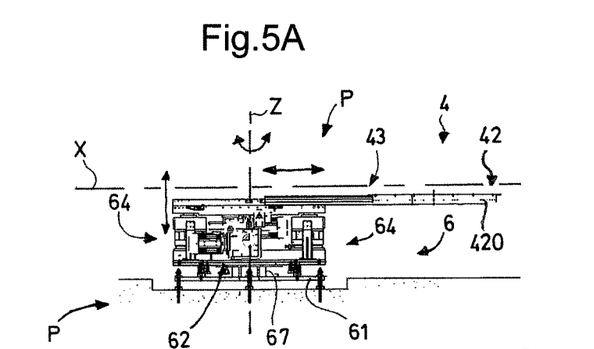
FIG. 5A shows the cell in a lateral view, according to plane 5A-5A, in an extended configuration.
Figure 5B:
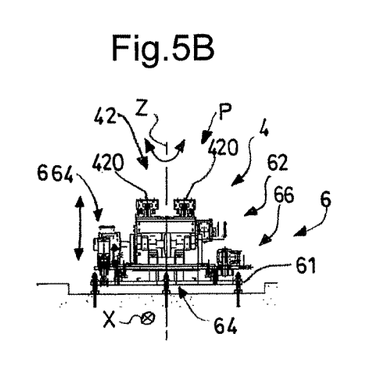
FIG. 5B shows the cell in a lateral view, according to plane 5B-5B, in a lowered condition.
Figure 5C:
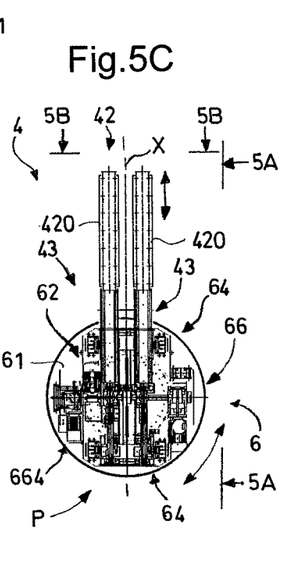
FIG. 5C shown the cell in a plan view from above in a first operating configuration with the forks aligned along the longitudinal axis of the system.
Figure 5D:
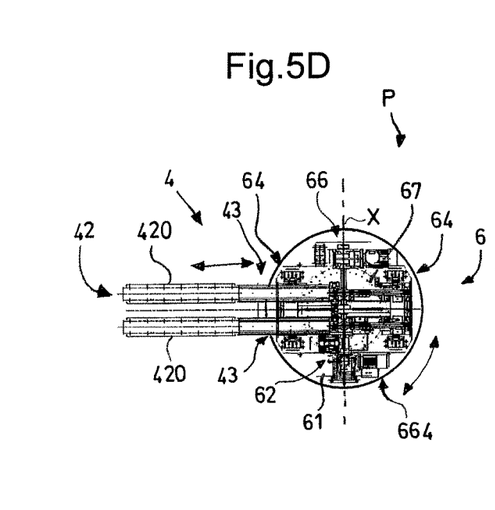
FIG. 5D shows the cell in a second operating configuration, rotated by 90° counterclockwise relative to the first configuration.
Figure 5E:
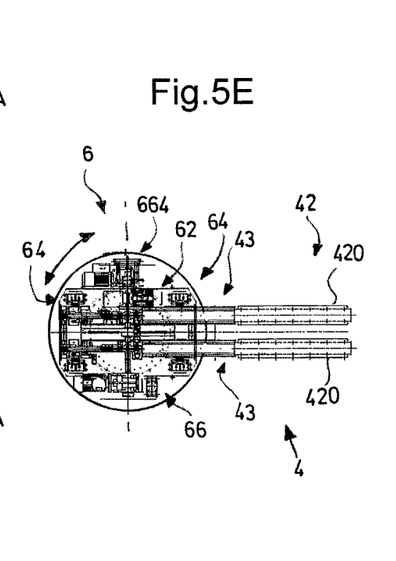
FIG. 5E shows the cell in a third operating configuration, rotated by 90° clockwise relative to the first configuration.

Said third actuator 66 is able to move said first gripping device 4—and, in particular, forks 42—along said axis "Z", both when they are in an extended configuration, for example shown in FIGS. 5D-5E, and when they are in a contracted configuration.

Said third actuator 66, besides said forks 42, also causes said first actuator 62 and/or said second actuator 64 to rotate around said vertical axis "Z". In this embodiment, said third actuator moves a structure comprising the forks, the guides, said first actuator, said second actuator and all the mechanisms relating thereto.

In the embodiment shown in the figures, said third actuator comprises a fifth wheel or rotary table 67, which is fixed between base 61 and the remaining part of the structure of cell "P". Through said fifth wheel 67, cell "P" can rotate around said axis "Z". Said fifth wheel 67 is shown in FIG. 5A in a possible embodiment of its.

Said third actuator 66 comprises, furthermore, a motor means and a mechanism, capable of acting upon base 61, so as to impart the rotary motion needed to move the cell arranged on said fifth wheel 67. An explanatory embodiment of the third actuator 66 is shown, at least partly, in FIG. 5B.

The third actuator 66 comprises, furthermore, a brake device 664, which is designed to selectively strike against said base 61, in particular only when said cell has reached the desired configuration, so as to avoid accidental rotations of the fifth wheel and, consequently, of cell "P" around axis "Z". Said brake device can also comprise a stopper, capable of striking against said base 61, so as to brake the rotation of the cell, for example to properly slow down its rotation speed. Furthermore, once the cell has stopped, the stopper is able to keep the cell in this position, always striking against said base 61.

Said brake device 664 also prevents the displacements of loads on said cell from causing accidental rotations of cell "P" itself.

A possible embodiment of brake device 664 is shown, for example, in FIG. 5B.

All the features described above for the previous embodiments of cell "P" can be associated with the present embodiment in the combination that is deemed to be the most suitable based on the needs of plant 1, without for this reason going beyond the scope of protection of the present invention. The features described above with reference to FIGS. 5A-5E are definitely preferred, though not limiting.

In the embodiment shown, in order to make up for the presence of fifth wheel 67, said cell "P" is placed in a housing made in the ground, so as to cause all the cells of moving system 2 according to the present invention to lie on a common plane.

In the present embodiment, said first moving device is a single assembly comprising said first actuator 62, said second actuator 64 and said third actuator 66.

In general, each cell "P" is able to move, without distinctions, in the two ways along the same direction, without a special preferred way, thus being completely manufactured in a two-way fashion.

Each cell "P" comprises a control system, which is able to determine its position and, as a consequence, control the movement of forks 42 in the space.

In an explanatory embodiment, which is not shown herein, said moving device 6 comprises fourth actuators, capable of changing the distance between the points of the forks of the same gripping device.

Using said cells "P", moving system 2 according to the present invention becomes a modular system.

For the purpose of the present description, the term "modular system" indicates a system consisting of modules that can easily be combined with one another, so as to obtain the features of the desired system, wherein each module can be added, eliminated or replaced without having to redesign the entire system. As a matter of fact, system 2 allows each single cell "P" having the desired features to be placed between two or more stations, thus allowing it to be replaced with a different cell "P", if the conditions of the plant change. By mere way of example, in case a station is added or removed or if the features of one or more stations of a plant change, the moving system according to the present invention easily adjusts to the changes of the plant by modifying the type of cell "P" arranged between two or more stations "S". The present solution, furthermore, facilitates the maintenance of moving system 2.

Moreover, moving system 2 according to the present invention is able to quickly adjust to possible changes in the sizes of the plant, without affecting the operation of the moving system itself, even if the features of the plant to which it is associated vary.

In general, input/outputs station 3 comprises said at least a second gripping device 32, which is shaped as a forks 321. Preferably, said station 3 comprises at least two forks 321, more preferably four forks.

Forks 321 associated with input/output station 3 are preferably rigid. Alternatively, telescopic forks can be used.

In general, said station 3 can be made so as to act both as an input portal and as an output portal, without distinctions. Alternatively, said station 3 can be configured so as to exclusively act as input portal or as an output portal. In the last embodiment, system 2 needs to comprise two stations 3, one to let containers into system 2 and one to let containers out of the system itself.

Said input/output station 3 comprises a bearing structure 31. Said bearing structure 31 is preferably shaped as a portal comprising at least two columns 312.

Said second moving device 34 is at least partially built-in in the bearing structure.

Preferably, said station 3 comprises two second gripping devices 32, each arranged in correspondence to a column 312.

Figure 6A:
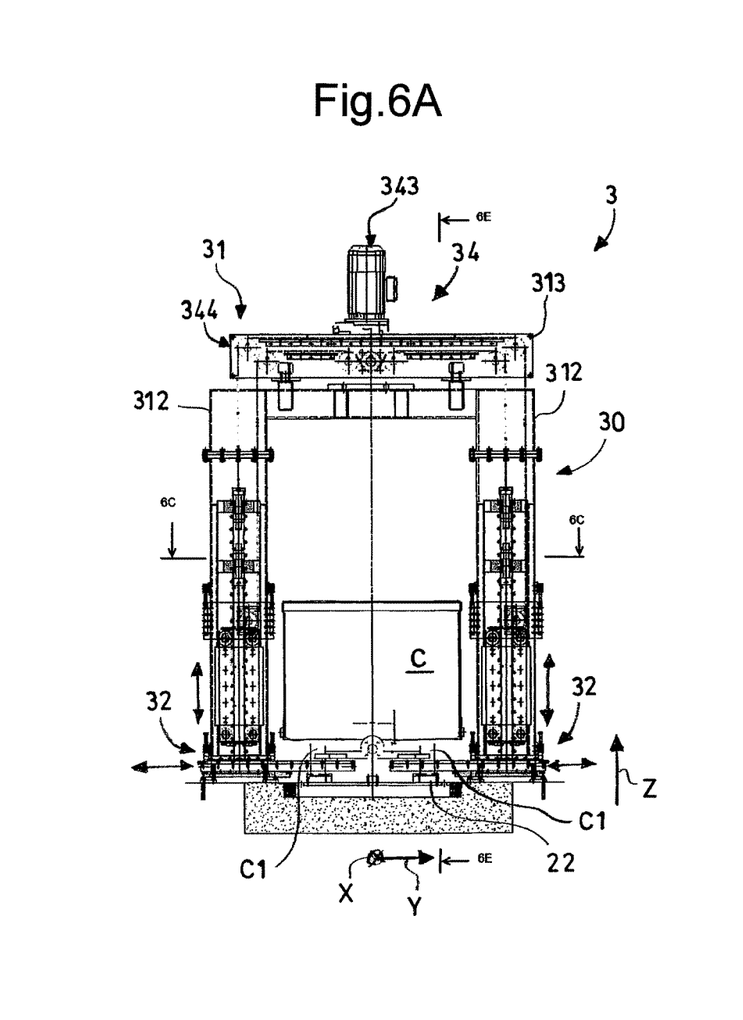
FIG. 6A shows a front view of the station in a first operating configuration, in which the container lies on the ground.
Figure 6B:
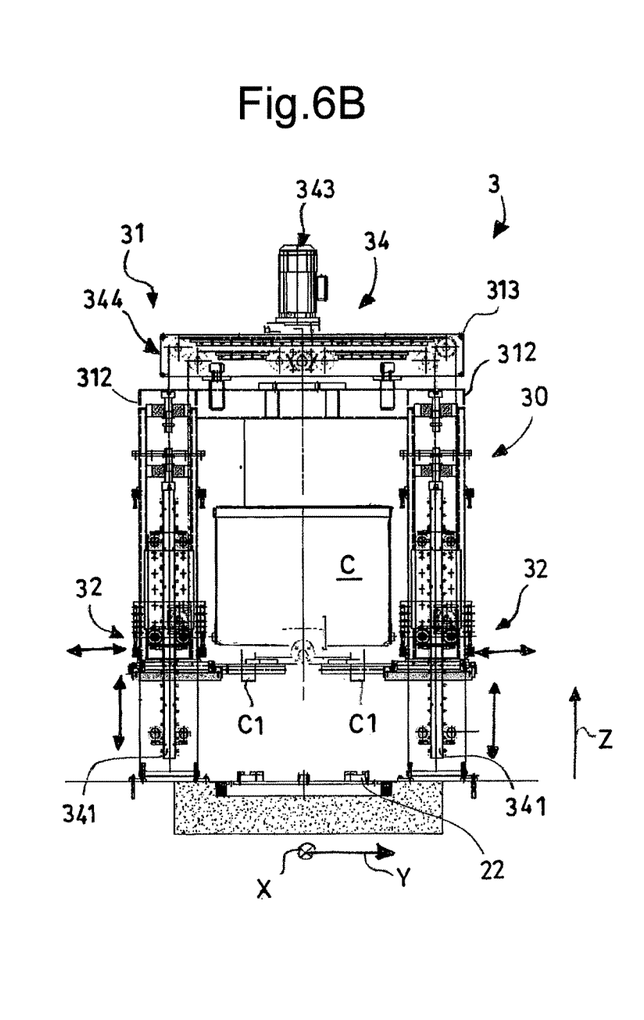
FIG. 6B shows the front view of the station in a second operating configuration, in which the container is lifted from the ground.
Figure 6C:
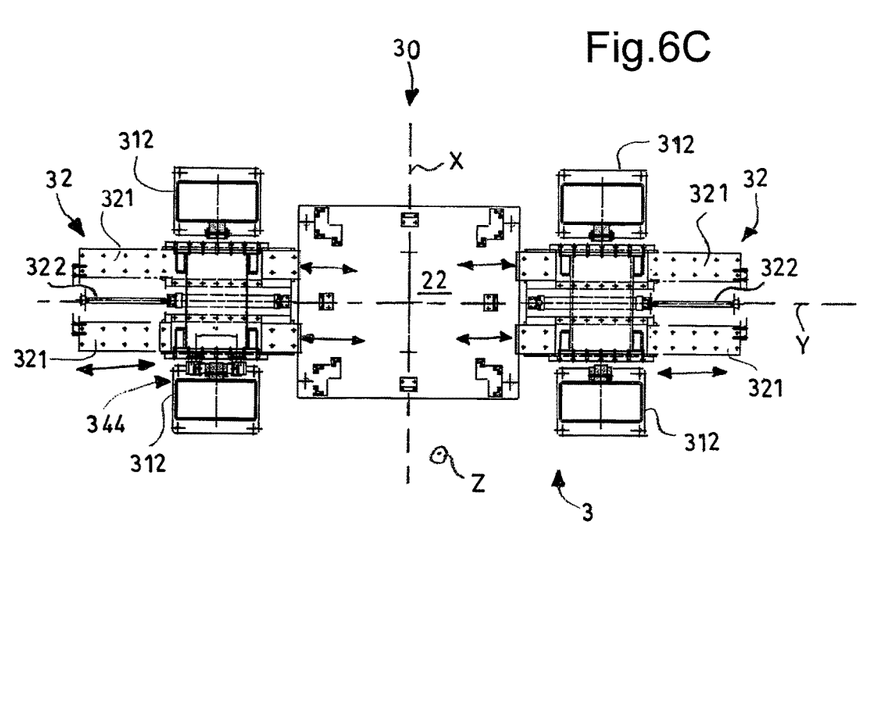
FIG. 6C shows the station, in a cross-sectional view from above along axis 6C-6C, in a third configuration, in which the forks are retracted.
Figure 6D:
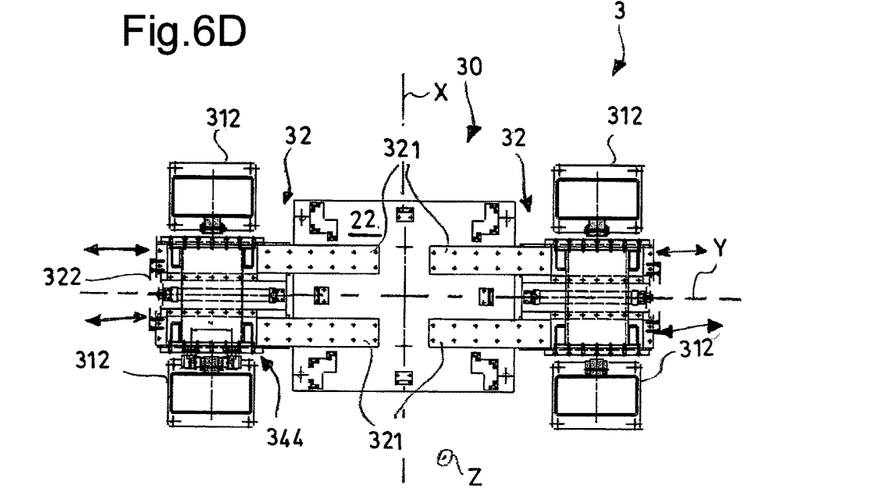
FIG. 6D shows the station in a fourth operating configuration, in which the forks are extended.
Figure 6E:
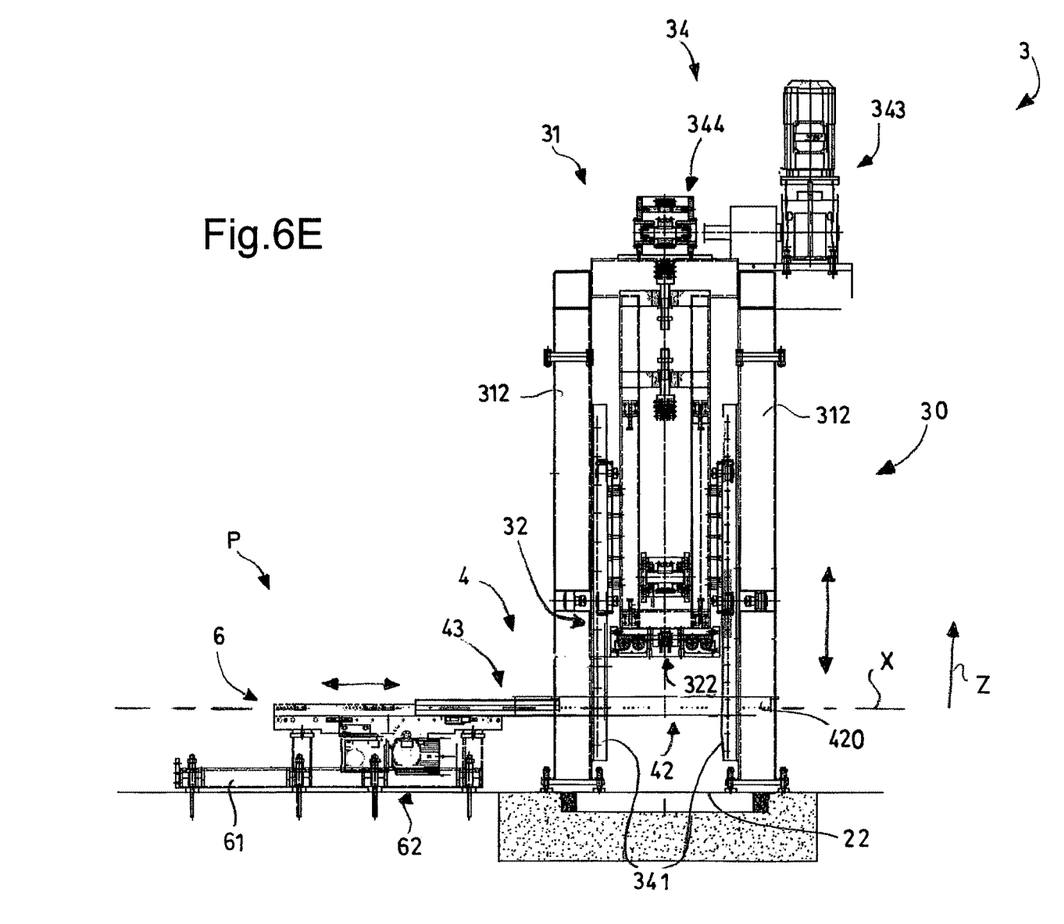
FIG. 6E shows the station, in a lateral view according to plane 6E-6E, in the second operating configuration, also showing the interaction with a cell for moving the container.

In the preferred embodiment, shown by way of example in FIG. 6E, each column 312 is made up of two uprights. In the hollow space between the two uprights of each column 312 there is placed the second gripping device 32 and the two columns 312 are joined to one another by a cross member 313, as shown by way of example in FIGS. 6A-6E.

As already mentioned above, said station 3 comprises two gripping devices 32, each arranged in correspondence to a column 312. Each one of said gripping devices 32 extends perpendicular to the respective column 312 along an axis joining the two columns. In particular, said second gripping device 32—and, in particular, said forks 321—move along a second axis "Y", which is perpendicular both to said first axis "X" and to said vertical axis "Z".

Equivalent embodiments that are not shown herein should anyway be considered as part of the present description. For example, operators could use a station 3 comprising a bearing structure 31 made up of one single column 312 associated with one single gripping device 32. This embodiment turns out to be asymmetrical.

Preferably, said bearing structure 31 has a mirror-like shape relative to the plane that is perpendicular to the ground, along said axis "X", as shown in FIGS. 6A and 6B.

Each one of said two columns 312 comprises, at least partly, both said second gripping device 32 and said second moving device 34.

As already mentioned above, said station comprises two pairs of forks 321, preferably one pair associated with each column 312.

In the embodiment shown, said bearing structure 31 defines an access gate 30, through which containers "C" enter moving system 2 according to the present invention.

Each one of said forks 321 is positioned so as to be moved along a direction that is perpendicular to said first axis "X". Preferably, said forks 321 can move along said second axis "Y". Said axis "Y" lies on a plane that is substantially parallel to the plane on which system 2 lies.

Therefore, said forks 321 are substantially moved perpendicularly relative to the longitudinal axis of system 2.

Said second moving device 34 comprises at least one linear actuator 322, capable of moving said forks along said axis "Y", basically along the longitudinal axis of the forks themselves.

Preferably, for each column 312 there is provided a linear actuator 322, capable of moving the respective pair of forks 321. Said linear actuator 322 preferably is a hydraulic piston, which, in the extended position, places the forks in a retracted position, in which they do not occupy the space overlooking a resting site 22. In the contracted configuration of linear actuator 322, the forks are extended, thus occupying the space overlooking site 22, so as to engage the container placed in said resting site 22. An explanatory embodiment of said linear actuator 322 is shown, by way of example, in FIGS. 6C and 6D.

In the embodiment of forks 321 comprised in station 3 that is shown herein, each fork comprises one single point.

Said second moving device 34 comprises, furthermore, a lifting actuator 343, capable of moving the second gripping device 32 along said vertical axis "Z".

Said lifting actuator 343, thanks to a kinematic mechanism 344, preferably a mirror-like chain one, is able to move said second gripping device 32 along at least one guide 341. In the preferred embodiment, said second gripping device 32 is able to slide along guides 341 extending along said vertical axis "Z", which are interposed in the hollow space between the two uprights making up a column 312, as shown in FIG. 6E.

Said kinematic mechanism, partially shown in FIGS. 6A, 6B and 6E, comprises a reduction gear, to which said lifting actuator 343, in particular a motor means, transmits the motion. Then, from said reduction gear, the motion is transmitted to the two columns 312 and, through a chain of gears, chains are moved, which, in turn, move the structure housing said second gripping devices 32, one for each column 312, in a coordinated manner.

The operation of this kinematic mechanism will not be described in detail, since it can be replaced with substantially equivalent embodiments that are able to move the second gripping devices in a coordinated manner, for example by means of a hydraulic piston system.

In correspondence to access gate 30, on the ground, there is preferably provided a resting site 22, in which the operator places, by means of suitable visual and/or auditory references, container "C", which can be grabbed by the second gripping device 32, so as to be introduced into moving system 2. Similarly, an output station 3 lets container "C" out at the end of the process carried out in plant 1, namely on a resting site 22 provided in correspondence to an output gate, through which the operator can remove container "C".

Said input/output station 3 comprises a plurality of sensors, capable of detecting the features of the container arranged in said station. Said sensors are preferably arranged close to said resting site 22.

Alternative embodiments of said station 3 should be considered as part of the scope of protection of the present invention.

Moving system 2 according to the present invention is especially suited to be used in a plant 1 for the production of fluids, such as paints, comprising at least one dosing station 11 and, if necessary, a mixing station 12.

Figure 7:
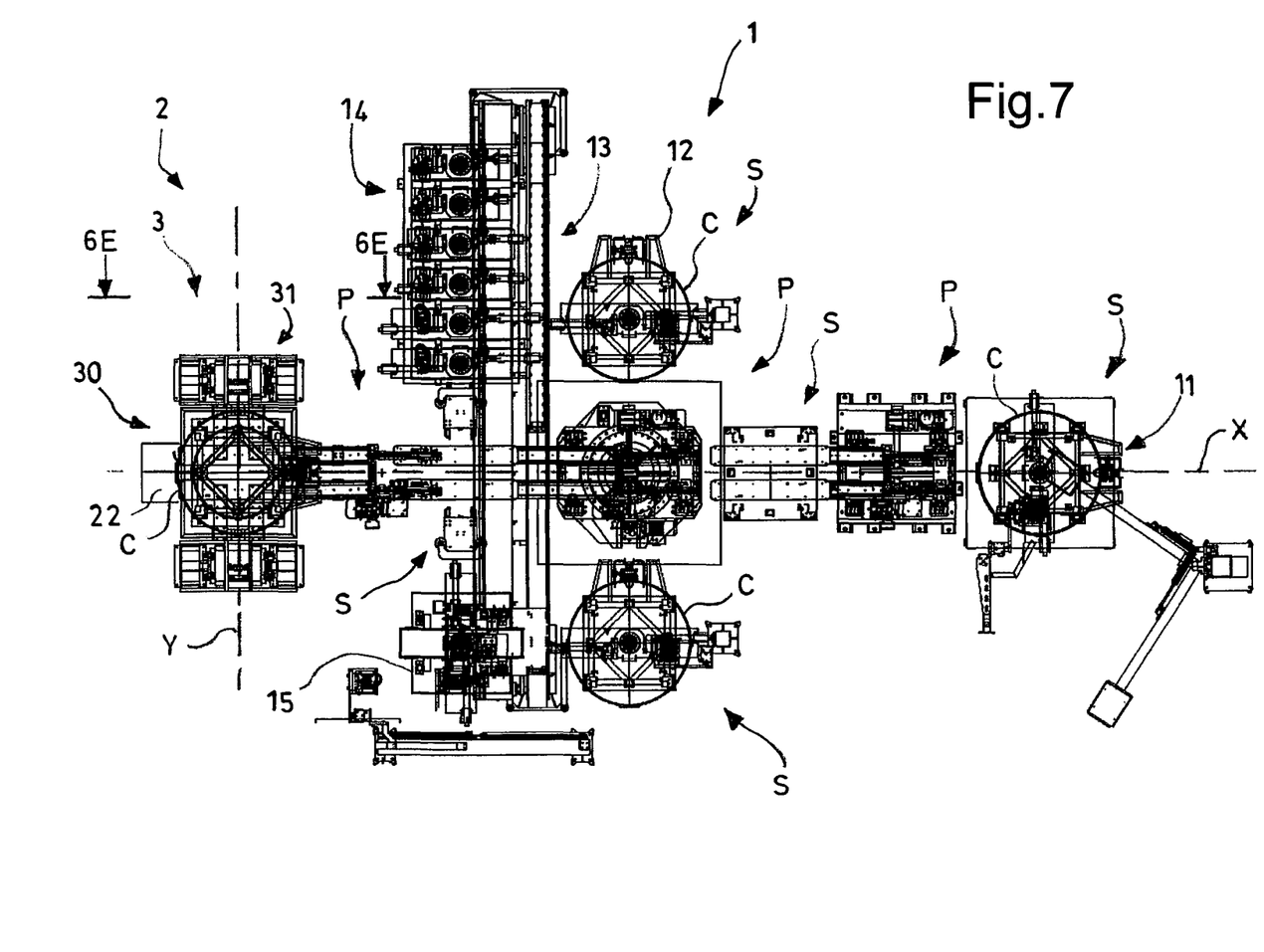
FIG. 7 shows, in a view from above, a possible embodiment of the system applied to a plant for the production of fluids, such as paints, for example shown in FIG. 1.

In the explanatory embodiment shown in FIGS. 1 and 7, said plant comprises a dosing station 11, which is arranged on the opposite side of plant 1 relative to station 3, and two mixing stations 12, which face one another and are arranged laterally relative to the longitudinal extension of plant 1. Plant 1 shown herein comprises a handler 13, capable of moving tools from a rack towards containers "C" or other stations, such as, for example, washing chamber 15.

Moving system 2 can comprise a centering station, capable of centering the container, for example by means of said ball plane 44. This station can be particularly useful when the container must interface with other systems, designed to move it or for other purposes, for example said handler 13, in which container "C" must take a particular position in the space. In particular, said station is especially useful when the container must take a single position for all the systems interacting with the container itself.

In the explanatory embodiment shown in the accompanying drawings, the following logical steps are substantially carried out in order to allow a container "C" to be introduced into, moved in and then removed from moving system 2.

The system is able to carry out, in parallel, the entire logical sequence—or part thereof—for different containers, thus allowing operators to simultaneously manage at least a number of containers "C" that equals the number of cells "P" available in the system.

In particular, container "C" follows the logical flow resulting from the following steps:

a) Placing container "C" in input station 3—namely, on resting site 22—to introduce container "C" into system 2;

b) Activating said second gripping device 32, so as to allow it to engage container "C";

c) Activating said second moving device 34, so as to lift said container "C";

d) Activating a first cell "P";

e) Activating said first gripping device 4, so as to allow it to engage container "C", and, at the same time, disengaging said second gripping device 32 of input/outputs station 3;

f) Activating said first moving device 6, so as to move said container "C" from said input/output station 3 to a following station "S";

g) Disengaging said first gripping device 4 of the first cell "P";

h) Activating a second cell;

i) Activating said first gripping device 4 of the second cell, so as to allow it to engage container "C";

j) Repeating steps f)-i) until moving system 2 has moved container "C" to all the stations that were programmed for the container;

k) Activating moving device 6, so as to place container "C" in said output station 3;

l) Activating said second gripping device 32, so as to allow it to engage container "C";

m) Activating said second moving device 34, so as to lower said container "C";

n) Deactivating said second gripping device 32, so as to disengage it from said container "C";

o) Removing container "C" from output station 3.

During step a) for placing container "C", the operator can place the container in said station 3 by moving it with a cart or a forklift, through which the operator can easily move containers "C" with different sizes, preferably comprising protuberances or legs "C1".

The possibility to use a cart allows operators to manually insert container "C" into moving system 2. In order to correctly place container "C", on the ground there is provided said site 22, which is provided with visual references that can be used to place container "C", so as to allow it to be correctly moved from and to system 2.

During step b) for activating said second gripping devices 32, forks 321, by means of the linear actuator 322, are moved, together, so as to laterally get hold of container "C", carrying out a movement along said second axis "Y".

Then, we move on to step c) for activating said second moving device 34, so as to lift said container "C". The second moving device 34, by lifting forks 321, lifts container "C", so as to bring it to a height that allows it to be picked up by a cell "P", which, in turn, moves it towards at least another station "S".

Subsequently, we move on to step d) for activating a first cell "P" and, substantially simultaneously with or after step d), operators carry out step e) for activating said first gripping device 4 of the activated cell.

During step e), the container is transferred from said input station 3 to said cell "P".

Preferably, said step e) comprises the following sub-steps:

e1) activating said first actuator 62, so as to place forks 42 under container "C", which is kept lifted by the second moving device 34;

e2) deactivating said second moving device 34 of station 3, thus lowering container "C" onto the forks of the cell or, if necessary, onto the ball plane associated with said forks;

e3) deactivating said second gripping devices 32, so as to disengage them from container "C", by retracting forks 321 comprised in station 3.

Said second gripping device 32 does not hamper the movement for the correct positioning of container "C", since it remains on the outside of the perimeter.

In this sub-step e3), the container entirely weighs on forks 42 associated with the cell "P".

At the end of sub-step e3) of step e), we can move on to step f) for activating said first moving device 6, thus moving the container towards another station "S". During this step, by means of the first actuator 62, said forks 42 are moved along their longitudinal axis, which, in the case shown herein, corresponds to said first axis "X", thus moving container "C" from input station 3 to another station "S".

After container "C" has reached stations "S", operators can carry out step g) for disengaging said first gripping device 4 of the first cell "P". During this step, the first gripping device 4 is retracted, activating said first actuator 62, which moves forks 42 retracting them. Based on the type of cell used, prior to the activation of the first actuator 62, said second actuator 64 can be activated, which allows forks 42 to be lowered, so as to prevent the container and forks 42 from scraping against one another, when the first actuator 62 is activated to retract/extract forks 42. The second and the third embodiment of cells "P" comprise said second actuator 64.

At the end of step g), the container is correctly positioned in station "S", where, if needed, a processing step is carried out, for example to process the content of container "C".

After step g), or simultaneously with it, step h) is carried out for activating a second cell. During this step, similarly to the previous step, the cell is activated so as to be able to operate and fulfill the tasks assigned to it.

After step h), we move on to step i) for activating said first gripping device 4, so as to allow it to engage container "C". This step is substantially similar to step e) described above.

After the first gripping device 4 of cell "P" has engaged container "C", operators can carry out step j) and repeat steps f)-i) until moving system 2 has moved container "C" towards all the stations needed for said container. Step j) ends when the container, after having reached the last station assigned to it by plant 1, is grabbed by the first gripping device 4, so as to be moved towards output station 3.

When repeating step f) for activating said first moving device 6, thus moving container "C" towards a station "S", based on the embodiment of cell "P", the latter can comprise a third actuator 66, which is suited to cause cell "P" to rotate. The third embodiment of cell "P" described above comprises said third actuator 66.

Similarly, when carrying out steps g) and i), during which gripping device 4 engages or disengages container "C", station "P" can comprise said second actuator 64, capable of moving forks 42 along vertical axis "Z" so as to facilitate the engagement or disengagement of container "C" avoiding mutual scraping between the parts.

After container "C" placed on the last station "S" has been grabbed, we move on to step k) for activating moving device 6, so as to place container "C" in said output station 3. This step is substantially reverse compared to step f) described above. After the container has been placed in station 3, operators can carry out step l) for activating said second gripping device 32, so as to allow it to engage container "C". Step l) is substantially reverse compared to step e), since it comprises sub-steps that are carried out in a reverse manner and with a reverse order.

Once the container has been delivered by the last cell "P" to forks 312 associated with station 3, which support said container "C", we can move one to step m) for activating said second moving device 34, so as to lower said container "C". During this step, the lifting actuator 343 is activated, which, thanks to said kinematic mechanism 344, lowers forks 312 from the higher height, where they received container "C", to the ground.

When the container reaches the ground, operators can start step n) for deactivating said second gripping device 32, so as to allow it to disengage said container "C". During this step, linear actuator 322 is activated, thus causing forks 312 to retract in order to disengage container "C". In order to prevent forks 312 from scraping against container "C", the second moving device 34 is designed in such a way that the forks are lowered so as not to bear the weight of container "C" before the activation of linear actuator 322. Basically, linear actuator 322 is activated, thus retracting forks 312, only when container "C" correctly rests on the ground in site 22 and the forks themselves have been removed from container "C".

At the end of step n), operators can carry out step o) for removing container "C" from output station 3.

This step, like step a), can manually be carried out by an operator using carts.

In the embodiment shown, station "S" following input station 3 is, for example, a centering station.

Cell "P" interposed between station 3 and the first following station "S", for example a centering station, is, for example, a cell "P" according to the first embodiment.

Cell "P" used to pick up container "C" from the first station "S", for example a centering station, is a cell "P" according to the third embodiment. In said cell "P", there is provided a fifth wheel 67, which can rotate by 90° in both directions, so as to reach other stations "S" where to place container "C".

Therefore, this cell "P" can place the container picked up from a station "S" in other three distinct stations "S". In the embodiment shown in FIG. 7, there are provided two mixing stations 12, where the content of container "C" is mixed, and a resting station, where container "C" is placed so as to allow it to be picked up by another cell "P". Said mixing stations 12 are arranged on the sides relative to said axis "X".

The different possible combinations with which container "C" can be moved by cell "P" according to the third embodiment can easily be figured out by a person skilled in the art and, for the sake of simplicity, will not be described in detail.

When the container is lying in resting station "S", it is picked up by a cell "P", for example a cell according to the second embodiment, which moves container "C" up to a dosing station 11.

Container "C", in order to get out of plant 1 shown herein, must follow the path already covered—or at least part thereof—backwards. Alternative embodiments thereof can easily be figured out by a person skilled in the art, thanks to the modularity of moving system 2 according to the present invention.

Said resting stations are, for example, stands comprising reference points where the container is placed so as to be easily picked up by following cell "P".

As already mentioned above, each cell "P" is interposed between two or more stations between which the container must be moved. Said stations can be processing stations or intermediate stations or resting stations where the container is placed. In said intermediate stations, operators can carry out operations that are not necessary for the production of the desired fluid, but are necessary for the correct operation of the plant: valve position check, container size check, etc. On the other hand, the resting stations are mere resting points for the exchange of container "C" between two consecutive cells "P", as shown for example in FIGS. 2 and 7.

Each cell "P" comprises spatial arrangement controls for forks 42, so as to control their position in the space. Said first moving device 6 comprises a control system, capable of determining in real time the correct position, for example the instantaneous one, of the first gripping device 4 and, consequently, of container "C" associated with gripping device 4.

Said input/output station 3 comprises said sensors, which are suited, for example, to detect the position of the forks, thus allowing an operator to insert or remove container "C" into or from station 3 itself. Said sensors, furthermore, are able to measure the shape of the container as well as the correct position on the inside of station 3.

Said station 3 also offers the chance to control the emptying valve of the container, checking whether it is correctly closed before the container is introduced into the moving system that will move it along plant 1, for example a plant for the production or the processing of fluids, such as paints.

The moving system to move containers "C" is provided with controls for the operators' safety, as it comprises one or more barriers, which are designed to prevent personnel from accessing system 2 or plant 1.

System 2 allows the containers to be moved only when the protective barriers are properly closed.

By checking the position of said barriers, one can determine whether the introduction or removal procedure can be carried out or whether the container can be moved from one station to the following one, thus increasing the operators' safety.

There are also selector switches, which are moved by an operator and through which the operator can communicate the intention to enter the plant in order to carry out maintenance works. The moving system enables the opening of an access gate only when the system or the plant—or at least part thereof—is completely safe.

Furthermore, stations "S" of plant 1 comprise safety devices, which allow operators to work under safe conditions, thus avoiding accidents.

The solution according to the present invention allows operators to use containers of different formats, in particular containers that are typically used in plants for the production of fluids, such as paints.

In the preferred embodiment, moving system can move containers ranging from 100 liters up to 1000 liters.

The system according to the present invention is particularly versatile and can be used for any type of plant, thus being able to adjust to the changes made to the plant itself.

As a matter of fact, the system is modular and the number of cells "P" and stations 3 can be varied in an easy and quick manner.

Alternative embodiments, which are not described herein, but can easily be figured out by a person skilled in the art, must be considered as part of the scope of protection of the present invention.

| NUMERICAL REFERENCES | |
|---|---|
| Production plant | 1 |
| Dosing station | 11 |
| Mixing station | 12 |
| Handler | 13 |
| Rack | 14 |
| Washing chamber | 15 |
| Moving system | 2 |
| Resting site | 22 |
| Input/output station | 3 |
| Access gate | 30 |
| Bearing structure | 31 |
| Columns | 312 |
| Cross member | 313 |
| Second gripping device | 32 |
| Forks | 321 |
| Linear actuator | 322 |
| Second moving device | 34 |
| Guide | 341 |
| Lifting actuator | 343 |
| Kinematic mechanism | 344 |
| First gripping device | 4 |
| Forks | 42 |
| Points | 422 |
| Guides | 43 |
| Ball plane | 44 |
| First moving device | 6 |
| Base | 61 |
| First actuator | 62 |
| Second actuator | 64 |
| Third actuator | 66 |
| Brake device | 664 |
| Fifth wheel | 67 |
| Container | "C" |
| Support protuberances | "C1" |
| Stations | "S" |
| First axis | "X" |
| Second axis | "Y" |
| Vertical axis | "Z" |

The invention claimed is:

1. A fork moving system to move containers of different sizes between a plurality of stations of a fluid production plant; said system comprising:
   at least one input/output station, in which a container is introduced into/removed from the moving system; the at least one input/output station defining a gate with two columns;
   a modular cell placed in a housing in the ground between two of said stations, said cell comprising:
      a first set of forks for removably supporting the container in and between stations, the first set of forks comprising two points and being telescopically slidably extendable and retractable from opposed sides of the modular cell along complementary guides;
      a first fork moving device to extend or retract the first set of forks and to move the container between at least two stations, said first fork moving device being mounted over a base having a planar structure securely fixed in the housing to the ground through anchors, said first fork moving device comprises a motor and a linear actuator for extending or retracting said first set of forks at least along a longitudinal axis of said first set of forks to transfer a supported container to a first set of forks of an adjacent modular cell or another station;

a vertical fork moving device for raising and lowering the first set of forks along a vertical axis to transfer a supported container when the first set of forks is extended and when the first set of forks is retracted, said vertical fork moving device being mounted over the base and below the first fork moving device, wherein the first fork moving device is raised and lowered by the vertical fork moving device;

a spatial arrangement control system controlling positioning of said first set of forks;

a second fork moving device for moving a second set of forks, for supporting the container arranged in said at least one input/output station, a second fork moving device comprising a second motor and a gear and chain mechanism for raising and lowering the second sets of forks vertically along the two columns;

a resting site on the ground corresponding to said gate, the resting site being configured for placing or removing the container from the fork moving system;

a rotational actuator for rotating said cell around a vertical axis, said rotational actuator comprising:

a rotary table positioned over said base of the first fork moving device, the first fork moving device and the vertical fork moving device being mounted over the rotary table, wherein the first fork moving device and the vertical fork moving device are rotatable about a vertical axis on said rotary table; and a third motor and a mechanism for moving the rotary table;

wherein said first set of forks being rotatable by the rotational actuator when the first set of forks is extended and when the first set of forks is retracted.

2. The system according to claim 1, wherein said two points are telescopic and extendible between opposed edges.

3. The system according to claim 1, wherein each of the second gripping devices extends perpendicular to said columns along an axis joining the two columns.

4. The system according to claim 1, wherein said at least one input/output station comprises a plurality of sensors, for detecting features of the container arranged in said station.

5. A plant for production of fluids, comprising at least one dosing station configured for dosing fluids in containers of different sizes based on volume and fluid type; the plant comprising a moving system according to claim 1.

* * * * *

UNITED STATES PATENT AND TRADEMARK OFFICE
CERTIFICATE OF CORRECTION

PATENT NO. : 10,843,149 B2  
APPLICATION NO. : 15/310632  
DATED : November 24, 2020  
INVENTOR(S) : Luca Drocco et al.

Page 1 of 1

It is certified that error appears in the above-identified patent and that said Letters Patent is hereby corrected as shown below:

On the Title Page

Item (30) Foreign Application Priority Data: "May 13, 2014 (IT) TO2014A0379" should read --May 13, 2014 (IT) TO2014A000379--

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*